United States Patent [19]

Hendy

[11] 4,060,680

[45] Nov. 29, 1977

[54] PRODUCTION OF ACRYLONITRILE COPOLYMERS

[75] Inventor: Brian Norman Hendy, Welwyn, England

[73] Assignee: Imperial Chemical Industries Limited, Great Britain

[21] Appl. No.: 668,816

[22] Filed: Mar. 22, 1976

[30] Foreign Application Priority Data

Apr. 10, 1975 United Kingdom .............. 14791/75
May 7, 1975 United Kingdom .............. 19133/75

[51] Int. Cl.² .......................................... C08F 212/10
[52] U.S. Cl. .................................... 526/201; 260/879; 260/887; 526/89; 526/222; 526/224; 526/233; 526/234; 526/342
[58] Field of Search ............... 526/342, 222, 201, 224, 526/234

[56] References Cited

U.S. PATENT DOCUMENTS

| | | | |
|---|---|---|---|
| 3,634,370 | 1/1972 | D'Alelio | 526/342 |
| 3,828,013 | 8/1974 | Nield | 526/342 |
| 3,849,384 | 11/1974 | Nield | 526/342 |

Primary Examiner—Harry Wong, Jr.
Attorney, Agent, or Firm—Cushman, Darby & Cushman

[57] ABSTRACT

A process which comprises producing a uniform copolymer of acrylonitrile and at least one faster-reacting aromatic olefine containing 50–95% molar of acrylonitrile units wherein the polymerization is conducted in the presence of at least one thiol as chain-transfer agent and the reaction medium is maintained at pH $\leq$ 4.5, e.g. by using dilute sulphuric acid.

9 Claims, No Drawings

PRODUCTION OF ACRYLONITRILE COPOLYMERS

The present invention relates to a process for the production of copolymers of acrylonitrile and conjugated aromatic olefines and in particular to the production of copolymers containing a high proportion of acrylonitrile.

Owing to the great ease with which many conjugated aromatic olefines copolymerise in the presence of a high proportion of acrylonitrile, the proportion of copolymer formed at the beginning of the reaction tends to be enriched with the aromatic olefine at the expense of the portion of copolymer formed at the end of the reaction, and the latter tends therefore to have the disadvantageous properties of crystalline polyacrylonitrile unless precautions are taken to feed the monomers, or at least the aromatic olefine, into the reaction medium throughout the course of the polymerisation such that the concentration ratio between the monomers at the site of the reaction is maintained substantially constant whereby a 'uniform copolymer' is formed; by a 'uniform copolymer' is meant a copolymer in which the polymer molecules formed early in the reaction have substantially the same average compositions as those formed subsequently.

A convenient method of doing this is described in our British patent specification 1,197,721 the disclosure of which is incorporated herein by reference. In this method, the heat of polymerisation during the reaction is measured by calorimetry and monomer added pro rata as heat is produced.

In specification 1,197,721 thiols such as butane-1-thiol and octane-1-thiol are used as chain-transfer agents to ensure that the resulting polymer has substantially constant molecular weight and chain length. Such copolymers are advantageously employed in the packaging of foodstuffs and medicine as films, and as moulded containers such as bottles.

The control of molecular weight is an important factor in obtaining a polymer of good melt stability which will provide mouldings of acceptable colour and clarity. Hitherto, it has been found that polymerisation in this system, using a thiol as chain-transfer agent, has sometimes resulted in somewhat erratic control of molecular weight and the resulting polymer has often exhibited unacceptably high reduced viscosity. This has particularly been the case when polymerisation has been carried out in aqueous suspension. Increasing the amount of thiol to overcome this problem is not desirable as this may cause the product to be tainted or to have a strong odour.

According to the present invention there is provided a process which comprises producing a uniform copolymer of acrylonitrile and at least one faster-reacting aromatic olefine containing 50–95% molar of acrylonitrile units by feeding a portion of at least the aromatic olefine to the reaction mixture during polymerisation so that the polymer molecules formed early in the polymerisation reaction have substantially the same average compositions as those formed subsequently and conducting the polymerisation in the presence of at least one thiol as chain-transfer agent while maintaining the reaction medium at pH $\leq 4.5$.

The process of the invention, in which the reaction medium is maintained strongly acid, allows acrylonitrile/aromatic olefine copolymers of high acrylonitrile content to be made which have consistently low reduced viscosity (e.g. $\leq 0.75$, often 0.60–0.72, determined as a 5% solution in dimethyl formamide at 25° C); they have exceptionally good melt stability, colour and clarity. An important feature of the invention is that mouldings may be fabricated from the copolymers made according to the process of the invention which are reproducibly free from haze.

The required acidity in the process of the invention may be achieved e.g. by the addition of a suitable mineral acid to the reaction medium before or during polymerisation. Examples of suitable acids include sulphuric acid, hydrochloric acid, and ortho phosphoric acid; dilute sulphuric acid (e.g. a 1–10% aqueous solution) is particularly convenient to use. Conveniently the reaction medium may be maintained at about pH 3 to 4 during the polymerisation.

The method of the invention is particularly advantageously applied to polymerisation in aqueous suspension using a granulating agent and a monomer-soluble initiator. Examples of monomer-soluble initiators which may be used include acyl peroxides, dialkyl peroxydicarbonates, and azo compounds having activating substituents such as nitrile groups. They may conveniently be added to the reaction medium as a solution in an organic solvent such as acetone or toluene. Particularly preferred granulating agents are polyvinyl pyrrolidone (K value $\geq 60$) and hydroxyethyl cellulose as their use enables polymers of excellent granulometry to be made. Since polymerisation in aqueous suspension mostly takes place in the monomer phase it may be desirable to employ a salt to lower the solubility of acrylonitrile in water. Suitable salts include aluminium sulphate, magnesium sulphate and sodium sulphate. A material such as dimethyl dithiocarbamate may also be added to supress aqueous-phase polymerisation.

The aromatic olefine used in the production of the acrylonitrile copolymer is selected from those of formula

$$CH_2:CR.Ar$$

and also acenaphthylene, indene and coumarone. In this formular R is hydrogen or methyl and Ar is an optionally ring-substituted residue of aromatic character having not more than 3 rings and each substituent (if any) having not more than 4 carbon atoms. Examples of such olefines include styrene, α-methylstyrene, o-methylstyrene, m-methylstyrene, p-methylstyrene, m-vinylphenol, p-trimethylsilylstyrene, 2,5-dimethylstyrene, p-methoxystyrene, 1-vinylnaphthalene, p-dimethylaminostyrene, ar-dibromostyrene, p-acetamidostyrene, 2-vinylthiophene, 3-vinylphenanthrene, 2-methyl-5-vinylpyridene and N-vinylcarbazole. The preferred composition is one in which styrene or α-methylstyrene is the predominant aromatic olefine.

The copolymers produced by the process of the invention preferably contain 80–93% molar, particularly 86–90% molar, of acrylonitrile units since the use of this range results in a excellent combination of impact strength and impermeability, which is highly desirable if the copolymer is to be moulded into containers, e.g. bottles for packaging foodstuffs, beverages, or medicines.

The thiols which are commonly used as chain transfer agents so as to control the molecular weight of the polymer are usually alkane thiols. The alkane residue can contain up to 20 carbon atoms and primary, secondary or tertiary thiols may be used. Commonly used thiols are listed in the following Table 1 in which boiling points at atmospheric pressure are also given.

TABLE 1

| THIOL | BOILING POINT (° C) | |
| --- | --- | --- |
| methanethiol | 7 | |
| ethanethiol | 35 | |
| 1-propanethiol | 68 | |
| 2-propanethiol | 60 | |
| 1-butanethiol | 98 | |
| 2-butanethiol | 88 | |
| 1-pentanethiol | 126 | |
| 2-pentanethiol | 119 | |
| 3-pentanethiol | 119 | |
| 1-hexanethiol | 150 | |
| 1-heptanethiol | 176 | |
| octanethiol (primary) | 180 – 210 | |
| octanethiol (secondary) | 180 – 190 | |
| octanethiol (tertiary) | 155 – 167 | |
| nonanethiol (tertiary) | 190 – 210 | |
| 1-decanethiol | 240 | |
| undecanethiol (secondary) | 215 – 240 | |
| dodecanethiol (primary) | 142 – 145 | (15 torr) |
| dodecanethiol (secondary) | 125 – 130 | (10 torr) |

Other thiols which are isomers of those listed above may also be used. The use of thiols such as limonene dimercaptan, pentaerythritol tetra-(3-thiopropionate), iso-octyl thioglycolate and trimethylolpropane tri-3-thiopropionate), thioethanol and α-thioglycerol is also within the scope of the invention.

Preferably a portion of the chain-transfer agent is added to the initial reaction mixture, the remainder being added with the feed of the aromatic olefine. Other types of materials which act, inter alia, to control molecular weight, such as dipentene, terpinolene and dihydroanthracene, may be used in combination with the thiol, e.g. in the initial phase and/or in the feed. It may also be desirable during and particularly towards the end of the polymerisation to add a small amount of a material which retards polymerisation, in order to curtail very rapid increases in the reaction rate which occasionally occur due to effects like autoaccelerated polymerisation. Suitable materials include terpenes such as dipentene or terpinolene, dihydroanthracene and phenols such as p-methoxyphenol.

The properties of the copolymers made using the process of the invention may be modified by copolymerising one or more additional ethylenically unsaturated monomers with the acrylonitrile and aromatic olefine. These additional monomers will normally represent only a small percentage of the total copolymer, i.e. less than 10% molar and usually less than 5% molar, and generally may be added in entirety to the initial charge. However where the reactivity of the added monomer is high compared with that of acrylonitrile (particularly when they are themselves conjugated aromatic olefines), or where relatively large quantities are involved, it may be preferable to add all or part of the modifying comonomers with the monomer feed. For instance the polymer may be made flame-retardant by using dibromostyrene as part or all the aromatic olefine; in this case the dibromostyrene would be added to the reaction vessel with the monomer feed. Improved dyeability may be imparted by adding as a comonomer a few percent of vinyl pyridine. The processability may be improved by adding to the initial charge a few percent of a long-chain alkyl vinyl ether, e.g. cetyl vinyl ether. The softening point may be increased by adding to the initial charge a few percent of a copolymerisable cyclic compound such as a maleimide or norbornene derivative. A few percent of methyl methacrylate in the initial charge may allow, inter alia, improved control of refractive index to be achieved.

A major potential use for a copolymer made by the process of the invention is as the resinous superstrate of a graft copolymer having a rubber substrate. Another major potential use is as the resinous component (not containing rubber) of a blend with a compatible graft copolymer having a rubber substrate. Such a graft copolymer may be made using emulsion or suspension polymerisation. Preferably, however, the graft copolymer is made using emulsion polymerisation, and there is provided a blend comprising a resinous uniform copolymer of acrylonitrile and at least one conjugated aromatic olefine prepared by a process as hereinbefore defined, preferably in aqueous suspension, and a compatible graft copolymer having a diene rubber substrate prepared by an aqueous emulsion polymerisation process. Preferably, such a blend contains 1 to 50% by weight of the diene elastomer, particularly 1 to 25%. Suitable for such blends are grafts containing a polybutadiene substrate and a superstrate of acrylonitrile/isobutene copolymer (as described in British Patent Specification 1,143,408) or of uniform acrylonitrile/styrene copolymer having a high percentage of acrylonitrile (as described in British Patent Specification 1,185,305). A graft or blend as described is generally tougher than the untreated copolymer of the present invention, and tends to have, for example, a high impact strength. The elastomer in the graft or blend, however, does tend to marginally decrease the impermeability and rigidity of the composition. It is important when blending the present copolymers to use a graft which is compatible therewith if the required degree of toughness is to be obtained. Preferred graft copolymers for blending with the uniform copolymers of the present invention are those having a superstrate of approximately the same composition as the uniform copolymers.

The present invention is illustrated by the following examples of which Examples 1–4 are comparative examples and Examples 5–16 are examples of the invention.

EXAMPLES 1–4

In a series of experiments, uniform copolymers of acrylonitrile and styrene containing 12–14% molar of uniformly distributed styrene units (as determined by infra-red analysis) were prepared by an aqueous suspension process using a distillation calorimeter (capacity 2 l) substantially as shown in FIG. 1 of British Patent Specification 1,197,721, the heat-exchanging liquid employed being 4-methylpentene.

The initial charge consisted of distilled water (1107 ml), acrylonitrile (703 ml), styrene (8 ml), octane-1-thiol (3.28 ml) as chain-transfer agent, a buffering system of disodium hydrogen orthophosphate (0.87 g) and potassium dihydrogen orthophosphate (12.64 g) to maintain pH at about 5.6, and sodium dimethyl dithiocarbamate (2.0 ml of a 1% aqueous solution) to suppress aqueous-phase polymerisation. In Examples 1–3, diterpene (1.00 ml) was included in addition to the thiol as part of the molecular weight control system; in Example 4 dihydroanthracene (1.00 g) was included in addition to the thiol as part of the molecular weight control system; in Examples 1, 3 and 4 polyvinyl pyrrolidone (K value 90, 1.44 g) was used as suspension agent; in Example 2, a mixture of hydroxyethyl cellulose ('Natrasol' 300H, 1.44 g), and ethylene diamine/propylene oxide/ethylene oxide condensate ('Tetronic' 707, molecular weight 11000, 0.72 g) was used as suspension agent. Air was removed from the reaction vessel in each case and replaced by nitrogen. The reaction medium was heated to about 60° C with the reactor contents being stirred.

Polymerisation was inititated by the addition of sufficient 2,2'-azo-bis-(2,4-dimethylvaleronitrile) to start the polymerisation and establish a reasonable reaction rate (5-8 ml of a 20% by weight solution in acetone was used in all cases) and a feed consisting of an air-free mixture of styrene (166 ml) and octane-1-thiol (3.9 ml) added pro rata according to the rate of reaction and integrated conversion (as determined calorimetrically). In Examples 1-3, dipentene (1.00 ml) was included with the feed; in Example 4 dihydroanthracene (1 g) was included with the feed.

Conversion was taken to about 60-80% (as calculated from the quantity of distilled 4-methylpentene) and the slurries stripped, filtered, washed and vacuum-dried (80° C) to yield free-flowing granular polymers. Reduced viscosity was determined as a 0.5% solution in dimethyl formamide at 25° C. The results are shown in Table 2.

EXAMPLES 5-14

These polymerisations were carried out substantially as for Examples 1-4; the phosphate buffering system was omitted however and replaced by dilute sulphuric acid (0.5 ml of 10% in Example 5 and 3.5 ml of 1% in Examples 6-14) to render the pH of the medium about 3.2-3.5. Aluminium sulphate (hydrated, 14.7 g) was also included in Examples 5-13 to reduce the water solubility of the acrylonitrile; in Example 14 magnesium sulphate was used instead of aluminium sulphate. Polyvinyl pyrrolidone was used as the granulating agent in Examples 5, 6, 8-14 and the 'Natrasol' 300 H/'Tetronic' 707 system used as granulating agent in Example 7. The amount of octane-1-thiol in the initial charge was reduced to 3.0 ml and in the feed to 3.0 ml. Dipentene (1.00 ml in initial charge and 1.00 ml in feed) was included with the thiol in Example 5 and dihydroanthracene (1 g in initial chanrge and 1 g in feed) in Examples 6-11. (Examples 12-14 did not employ any dipentene or dihydroanthracene.) Sodium dimethyl dithiocarbamate was omitted in Example 10.

The effect of the "acid" recipe of Examples 5-14 is shown in Table 2.

TABLE 2

| Example No. | Reduced Viscosity |
| --- | --- |
| 1 | 0.99 |
| 2 | 0.94 |
| 3 | 1.01 |
| 4 | 0.91 |
| 5 | 0.63 |
| 6 | 0.69 |
| 7 | 0.72 |
| 8 | 0.72 |
| 9 | 0.64 |
| 10 | 0.60 |
| 11 | 0.64 |
| 12 | 0.71 |
| 13 | 0.68 |
| 14 | 0.68 |

It can be seen that the use of an acid medium according to the invention yielded polymers of consistently lower reduced viscosity.

EXAMPLES 15 AND 16

Uniform copolymers of acrylonitrile and styrene containing uniformly distributed styrene units (12.4% molar in Example 15, 13.2% molar in Example 16 as determined by infra-red analysis) were made on a much larger scale than the copolymers of Examples 1-14 using a conventional steel autoclave (capacity 20 gallons) jacketted to take cooling water and fitted with a paddle stirrer.

The initial charge consisted of distilled water (54 l), acrylonitrile (34.3 l), styrene (394 ml), octane-1-thiol (150 ml) as sole molecular weight controller, polyvinyl pyrrolidone (K value 90, 70.3 g) as granulating agent, sodium dimethyl dithiocarbamate (100 ml of a 1% aqueous solution), dilute (1%) sulphuric acid (150 ml) and aluminum sulphate (hydrate, 722 g). Air was removed from the autoclave and replaced by nitrogen. The reaction mixture was heated to 60° C and agitated with the stirrer turning at 220 revolutions per minute.

Polymerisation was initiated by the addition of 2,2'-azo-bis-(2,4-dimethylvaleronitrile) (300 ml of a 20% by weight solution in acetone), and a feed consisting of an air-free mixture of styrene (8.08 l) and ocatane-1-thiol (150 nl) (as sole molecular weight controller) added pro rata according to the rate of the reaction and integrated conversion as determined from the heat output of the reaction (calculated from the rise in temperature and flow rate of the circulating water in the jacket which kept the autoclave contents at about 60°-65° C). The heat liberated and the instantaneous amount of styrene to be added to the reaction mixture were computed electronically from the flow rate and temperature difference (taking account of any extraneous heat loss/gains or other corrections resulting e.g. from changes in the batch or jacket temperatures). It was necessary to moderate the rate of polymerisation in Example 15 (but not in Example 16) by adding 100 ml of 10% dihydroanthracene solution (in toluene) towards the end of the reaction which had become rather rapid.

The resulting slurries were stripped, filtered, washed and dried to yield free flowing granular polymers. Reduced viscosity was determined on 0.5% solutions in dimethyl formamide at 25° C. Both products had reduced viscosity of 0.72.

The significant reduction in reduced viscosity found in Examples 5-14 using an acid recipe was therefore maintained on scaling up the procedure.

I claim:

1. A granular polymerization process for producing a uniform copolymer consisting of 50-95% molar of acrylonitrile units, 5-45% molar of units of at least one faster-reacting aromatic olefin selected from the group consisting of styrene and α-methyl styrene and 0-10% of other ethylenically unsaturated monomers, said copolymer having a reduced viscosity of $\leq$ 0.75 determined as a 5% solution in dimethyl formamide at 25° C., said process comprising feeding a portion of at least the aromatic olefin to the reaction mixture during the polymerization so that the polymer molecules formed early in the polymerization reaction have substantially the same composition as those formed subsequently and conducting the polymerization in the presence of (a) at least one thiol as chain-transfer agent selected from the group consisting of alkane thiols containing up to 20 carbon atoms, isooctylthioglycolate, trimethylolypropane tri-(3-thiopropronate), thioethanol and α-thioglycerol, (b) a granulating agent and (c) a momomer soluble initiator, while maintaining the reaction medium at pH ≦ 4.5.

2. A process according to claim 1 wherein the uniform copolymer produced has reduced viscosity of 0.60–0.72.

3. A process according to claim 1 wherein the reaction medium is maintained at pH 3–4.

4. A process according to claim 1 wherein the granulating agent employed is selected from polyvinyl pyrrolidone (K value ≧ 60) and hydroxyethyl cellulose.

5. A process according to claim 1 wherein a salt is included in the reaction medium which lowers the water-solubility of the acrylonitrile, said salt being selected from aluminium sulphate, magnesium sulphate and sodium sulphate.

6. A process according to claim 1 wherein the uniform copolymer produced contains 80–93% molar acrylonitrile units.

7. A process according to claim 1 wherein at least one additional ethylenically unsaturated monomer is copolymerised with the acrylonitrile and the at least one aromatic olefine, the additional monomer representing < 10% molar of the total copolymer.

8. A process according to claim 1 wherein the at least one thiol employed is an alkane thiol whose alkane residue contains up to 20 carbon atoms.

9. A process according to claim 1 wherein a portion of the chain-transfer agent is added to the initial reaction mixture and the remainder is fed during the polymerisation.

* * * * *